United States Patent [19]
Park

[11] Patent Number: 5,984,537
[45] Date of Patent: Nov. 16, 1999

[54] METHOD AND APPARATUS FOR PREVENTING THE DEVIATION OF A FOCAL PLANE SHUTTER BLADE

[75] Inventor: Jung-Ho Park, Changwon-si, Rep. of Korea

[73] Assignee: Samsung Aerospace Industries, Ltd., Changwon-si, Rep. of Korea

[21] Appl. No.: 09/012,217

[22] Filed: Jan. 23, 1998

[30] Foreign Application Priority Data

Jan. 24, 1997 [KR] Rep. of Korea .......................... 97-960
Oct. 14, 1997 [KR] Rep. of Korea ...................... 97-28464

[51] Int. Cl.⁶ ..................................................... G03B 9/00
[52] U.S. Cl. ........................... 396/443; 396/466; 396/489; 396/536; 396/207

[58] Field of Search ..................................... 396/443, 463, 396/464, 465, 466, 467, 468, 469, 470, 479, 480, 536, 452, 489, 484, 492, 207

[56] References Cited

U.S. PATENT DOCUMENTS 4,688,916  8/1987  Dobashi et al. ........................ 396/492

*Primary Examiner*—W. B. Perkey
*Attorney, Agent, or Firm*—Howrey & Simon

[57] ABSTRACT

An apparatus and a method for preventing the deviation of a focal plane shutter are disclosed. The apparatus has a back cover switch, a control unit and a shutter driver. The apparatus and method prevents the deviation of the focal plane shutter blade by opening the focal plane shutter when a back cover opens. The focal plane shutter is restored to an initial focal plane shutter state after the back cover is closed.

5 Claims, 5 Drawing Sheets

METHOD AND APPARATUS FOR PREVENTING THE DEVIATION OF A FOCAL PLANE SHUTTER BLADE

BACKGROUND OF THE INVENTION (a) Field of the Invention

The present invention relates to a photographic camera and, more particularly, to an apparatus and a method for preventing the deviation of a focal plane shutter blade.

(b) Description of the Related Art

A focal plane shutter, which comprises two sets or curtains of shutter blades each having a plurality of opaque thin plates, is installed in front of a photographic film surface. The two curtains include a leading blade curtain and a trailing blade curtain. During a film exposing operation, the leading blade curtain is moved from an extended state to a contracted state, whereupon the trailing blade curtain is moved from a contracted state to an extended state. A shutter speed is determined on the basis of the duration and width of a slit between the leading blade curtain and the trailing blade curtain.

A leading blade curtain 12 of a focal plane shutter appears when a back cover is opened, as shown in FIG. 1. When a user loads a film cartridge 15 in a cartridge chamber 11 and winds it onto a spool 13, the user may mistakenly touch the leading blade curtain 12 so that the focal plane shutter (leading blade curtain) may deviate from an initial position. The deviation of the focal plane shutter blade causes errors in photographic operation.

A conventional camera has a focal plane shutter attached to a sensor for detecting the deviation of the focal plane shutter, so that a release switch locks when the sensor detects the deviation. However, the conventional camera merely detects the deviation, but does not prevent such deviation from occurring.

SUMMARY OF THE INVENTION

In view of the prior art described above, it is an object of the present invention to provide an apparatus and a method for preventing the deviation of a focal plane shutter blade in which the focal plane shutter is opened when a back cover of the camera opens. That is, both a leading blade curtain and a trailing blade curtain contract when the back cover is open.

The present invention restores the focal plane shutter to an initial focal plane shutter state when the back cover is closed.

To achieve this and other objects, as embodied and broadly described herein, the invention includes a back cover switch that detects whether a back cover is open or closed and generates a corresponding signal, a control unit that generates a control signal to open the focal plane shutter when it receives from the back cover switch a signal indicating that the back cover is open, and a shutter driver that drives the focal plane shutter in response to the control signal.

Also, to achieve these objects, the present invention provides a method for preventing the deviation of a focal plane shutter in a camera having a back cover, including the steps of detecting whether the back cover is open, and opening the focal plane shutter when the back cover is open.

Both the foregoing general description and the following detailed description are exemplary and are intended to provide further explanation of the invention as claimed.

BRIEF DESCRIPTION OF THE DRAWINGS

The accompanying drawings provide further understanding of the invention and, together with the Detailed Description, explain the principles of the invention. In the drawings.

DETAILED DESCRIPTION OF THE PREFERRED EMBODIMENTS

The present invention will be described in detail with reference to the accompanying drawings.

Figure 1:
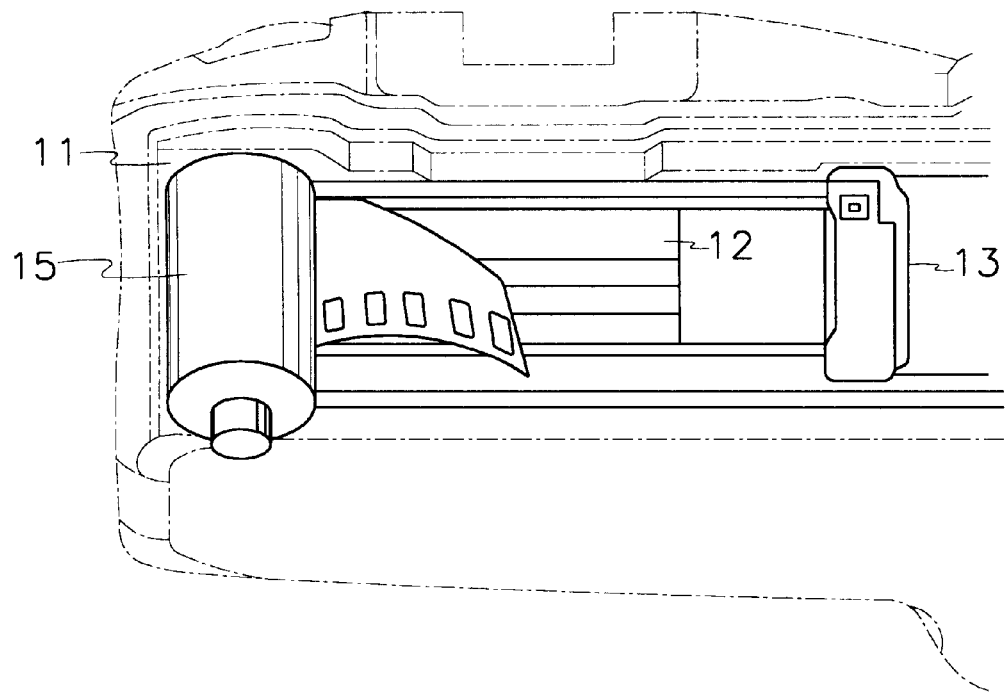
FIG. 1 illustrates a conventional camera having a focal plane shutter.
Figure 2:
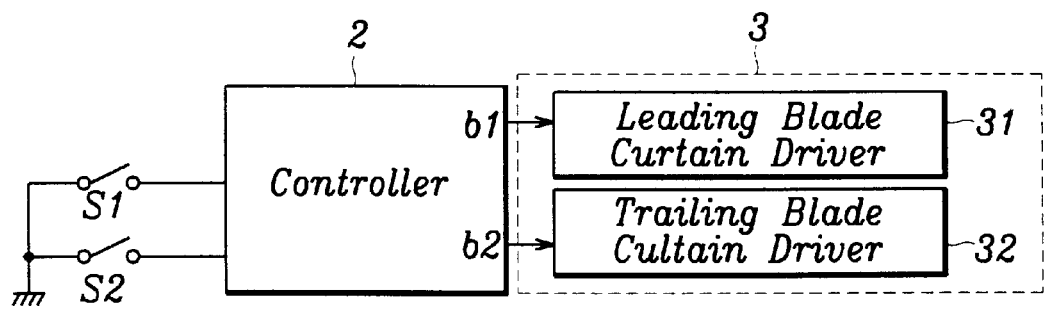
FIG. 2 is a block diagram of an apparatus for preventing the deviation of a focal plane shutter blade according to the present invention.

Referring to FIG. 2, a first preferred embodiment of the present invention includes a back cover switch S1, a film cartridge loading switch S2, a controller 2 and a shutter driver 3. The back cover switch S1 detects whether a back cover 1 (shown in FIG. 7B) is open or closed, and the film cartridge loading switch S2 detects whether a film cartridge is loaded or not in a cartridge chamber. When the back cover is open, the controller 2 generates a control signal to the shutter driver 3 to open a focal plane shutter 6 (shown in FIG. 7A). The controller 2 also generates a control signal to restore the focal plane shutter 6 to an initial focal plane shutter state when the back cover 1 is closed.

In a second embodiment of the present invention, when the back cover is open and the film cartridge is loaded in a cartridge chamber, the controller 2 may generate a control signal to the shutter driver 3 to open a focal plane shutter 6.

Figure 3:
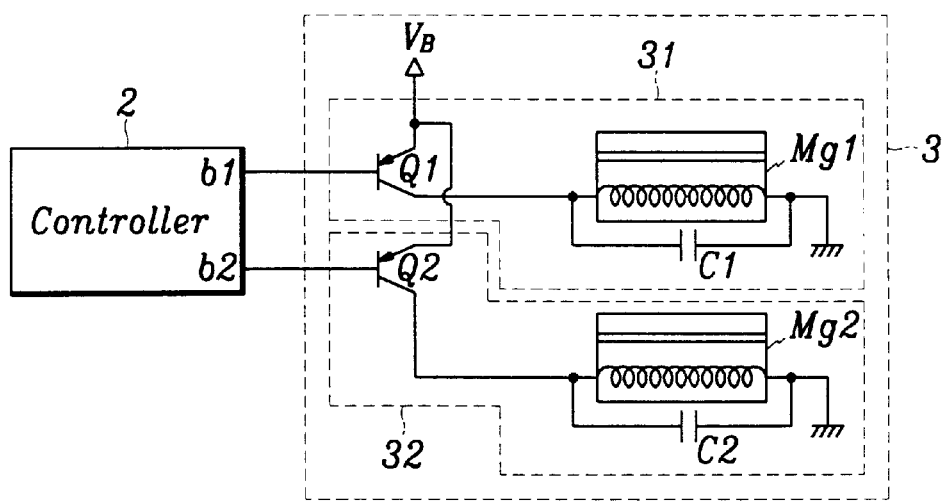
FIG. 3 is a circuit diagram of a shutter driver for a focal plane shutter according to the present invention.
Figure 4:
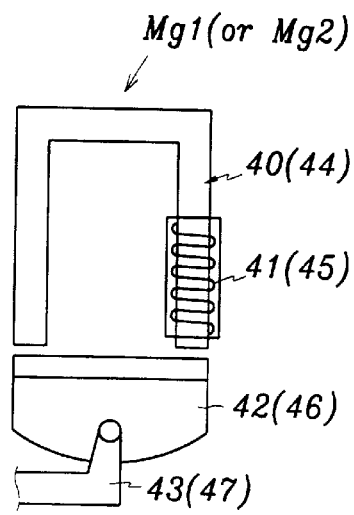
FIG. 4 is a detailed diagram of an electromagnetic unit of the circuit of FIG. 3.

Referring now to FIGS. 3 and 4, the shutter driver 3 will be explained. The shutter driver 3 comprises a leading blade curtain driver 31 and a trailing blade curtain driver 32 that control the leading blade curtain 61 and the trailing blade curtain 62 (shown in FIGS. 7A and 7B), respectively. The leading blade curtain driver 31 comprises an electromagnetic unit Mg1 that includes, a rotatable magnet 42 and a lever 43, an armature 40 of ferromagnetic material with a pair of spaced apart poles, and a coil 41 wound around one of the poles. Coil 41 is electrically connected to an energizing circuit. The energizing circuit comprises a transistor Q1 and a capacitor C1, and is connected to a controller 2 via a terminal b1. The rotatable magnet 42 is operatively associated with armature 40 and has opposite magnetic poles. The lever 43 mechanically couples the rotatable magnet 42 to the leading blade curtain 61. In a similar manner, the trailing blade curtain driver 32 has an electromagnetic unit Mg2 that includes a rotatable magnet 46, a lever 47, an armature 44 of ferromagnetic material with a pair of spaced apart poles, and a coil 45 wound around one of the poles. Coil 45 is electrically connected to an energizing circuit. The energizing circuit comprises a transistor Q2 a capacitor C2 and is connected to a controller 2 via a terminal b2. The rotatable magnet 46 is operatively associated with armature 44 and has opposite magnetic poles. The lever 47 mechanically couples the rotatable magnet 46 to the trailing blade curtain 62.

The shutter driver 3 of the present invention operates in the following manner. The magnets 42 and 46 are caused to rotate when the associated armature 40, 44 is energized with voltage $V_B$ of the proper electrical polarity and strength. The voltage $V_B$ is set to +4.5~+6V in the preferred embodiment of the present invention. As the magnets 42 and 46 move the leading blade curtain 61 and the trailing blade curtain 62, respectively, the shutter is opened or closed depending upon its initial states.

Figure 7A:
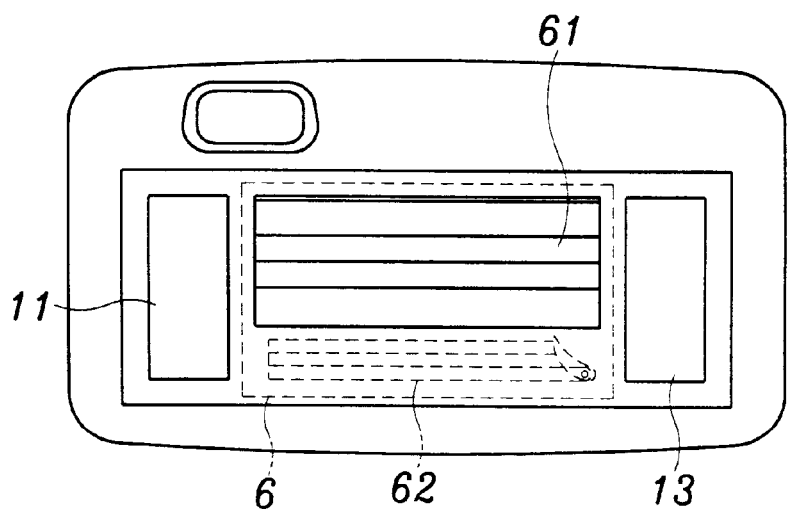
FIG. 7A illustrates a focal plane shutter blade in an initial state of an apparatus according to the present invention.
Figure 7B:
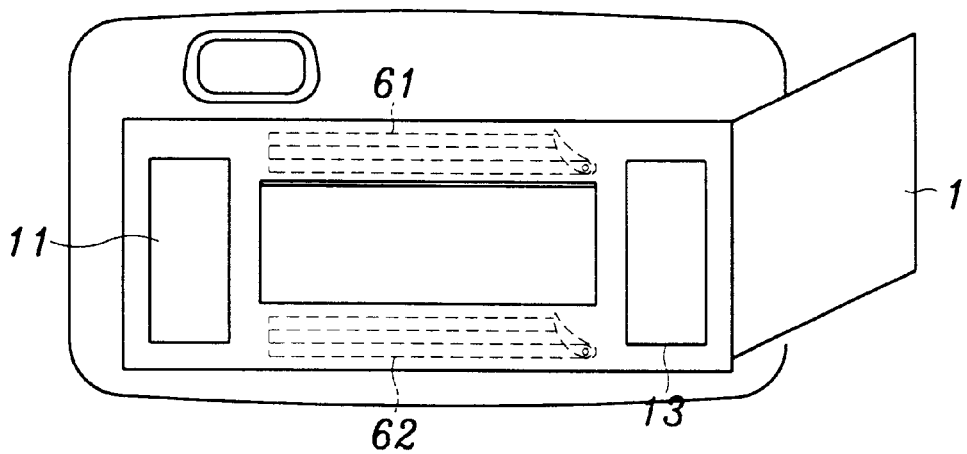
FIG. 7B illustrates a focal plane shutter blade when a back cover is open, according to the present invention.

FIG. 7A shows the initial state of the focal plane shutter 6. The leading blade curtain 61 and trailing blade curtain 62 are operatively associated with springs (not shown) which are installed above the leading blade curtain 61. The springs bias the leading blade curtain 61 and the trailing blade curtain 62 in the upper direction, while the shutter driver 3 drives the leading blade curtain 61 and the trailing blade curtain 62 in the downward direction in a initial state. That is, the leading blade curtain 61 is extended and the trailing blade curtain 62 is contracted in an initial state, as shown in FIG. 7A. Therefore, during a film exposing operation, the leading blade curtain is moved from an extended state to a contracted state, whereupon the trailing blade curtain is moved from a contracted state to an extended state. It will be recognized that the manner in which the leading and trailing blade curtains are driven well known to persons skilled in the art, one manner of which is disclosed in U.S. Pat. No. 5,508,773, by way of example.

Figure 5:
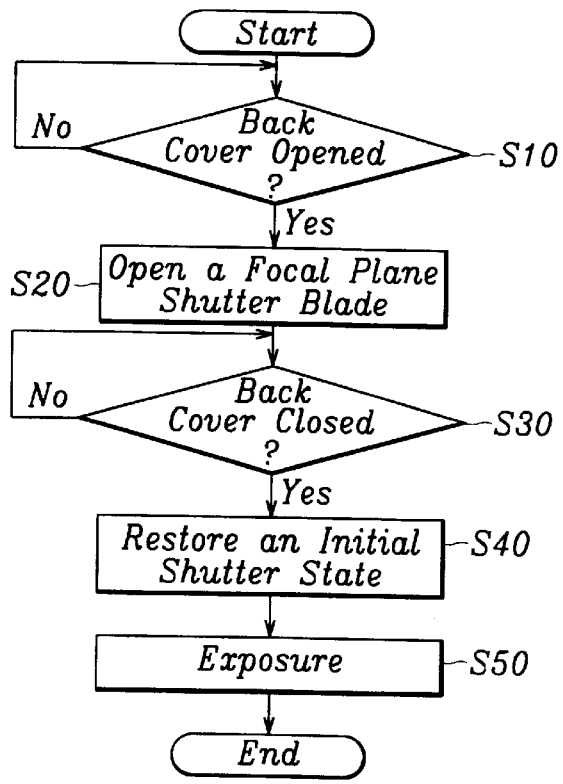
FIG. 5 is a flow chart of an operation of an apparatus for preventing the deviation of a focal plane shutter blade according to a first preferred embodiment of the present invention.

Now, referring to FIG. 5, an apparatus for preventing the deviation of a focal plane shutter blade according to a first preferred embodiment of the present invention operates in the following manner.

When a user opens a back cover 1 in order to set new film for exposing, a back cover switch S1 generates a corresponding signal to a controller 2. (step 10) Before the back cover 1 is opened, the focal plane shutter blade 6 is in an initial state, in which an electromagnetic unit Mg1 of a leading blade curtain driver 31 is energized to extend the leading blade curtain 61 and an electromagnetic unit Mg2 of a trailing blade curtain driver 32 is energized to contract the trailing blade curtain 62.

When the back cover 1 is opened, the controller 2 generates a control signal to a shutter driver 3 to open a focal plane shutter blade. (step 20) In response to the control signal received from the controller 2, the electromagnetic unit Mg1 of the leading blade curtain driver 31 is de-energized to contract the leading blade curtain 61.

When a user sets a film and closes a back cover 1, a back cover switch S1 generates a corresponding signal to the controller 2. (step 30) The controller receives the signal and generates a control signal to the shutter driver 3 to restore the focal plane shutter blade to an initial state, in order to prepare an exposure. (step 40) An exposure can then be made. (step 50)

Figure 6:
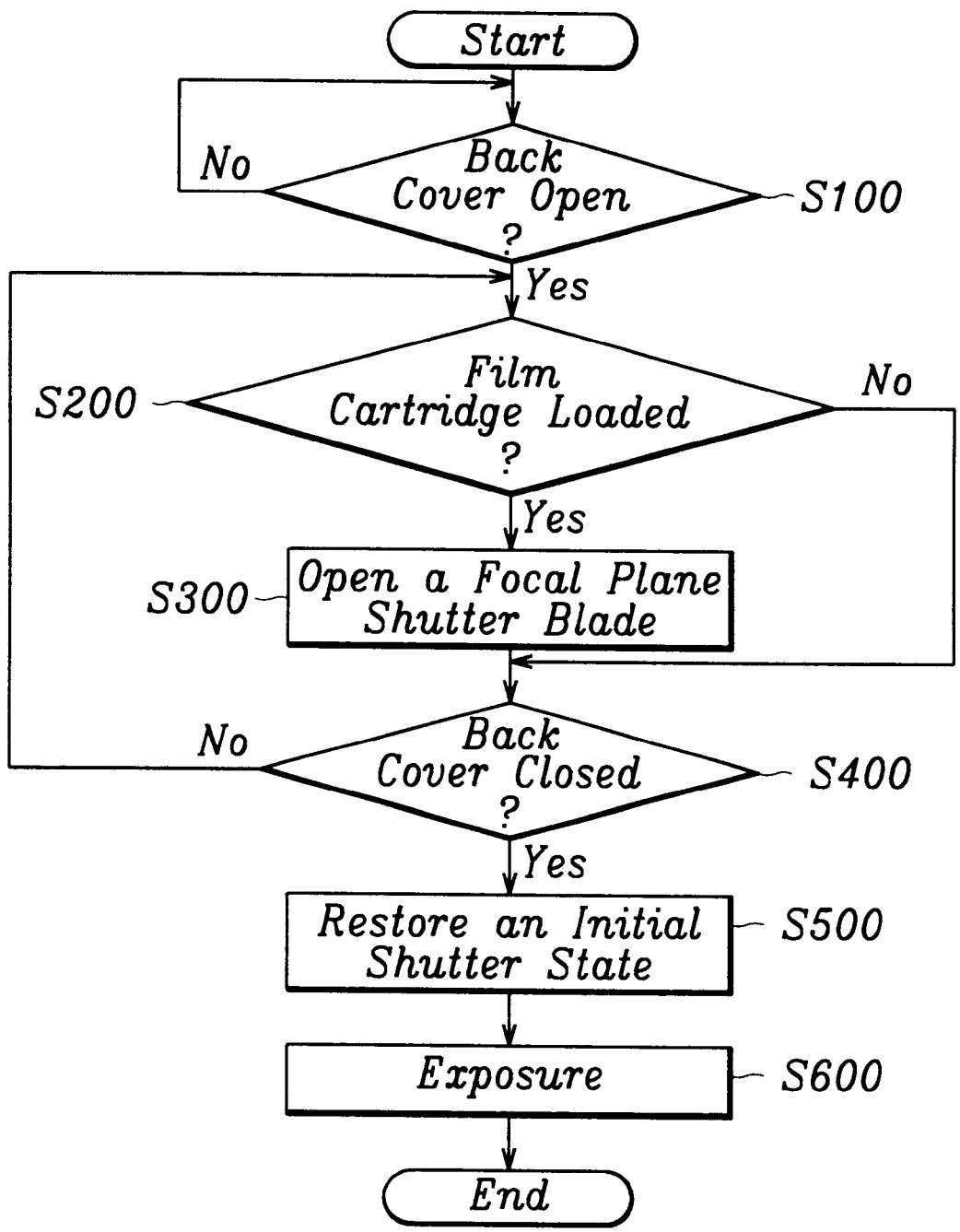
FIG. 6 is a flow chart of an operation of an apparatus for preventing the deviation of a focal plane shutter blade according to a second preferred embodiment of the present invention.

Next, referring to FIG. 6, an apparatus for preventing the deviation of a focal plane shutter blade according to a second preferred embodiment of the present invention operates in the following manner.

When a user opens a back cover 1 in order to set a new film for exposing, a back cover switch S1 generates a corresponding signal to a controller 2. (step 100) When the back cover 1 is opened, a film cartridge loading switch S2 detects whether a film cartridge is loaded or not in a cartridge chamber. When the film cartridge loading switch S2 detects that a film cartridge is loaded, it generates a corresponding signal to the controller 2. (step 200) Before the back cover 1 is open and the film cartridge is loaded, the focal plane shutter blade 6 is in an initial state, in which an electromagnetic unit Mg1 of a leading blade curtain driver 31 is energized to extend the leading blade curtain 61 and an electromagnetic unit Mg2 of a trailing blade curtain driver 32 is energized to contract the trailing blade curtain 62.

When the back cover 1 is open and a film cartridge is loaded in the cartridge chamber to set new film, the controller 2 generates a control signal to a shutter driver 3 to open a focal plane shutter blade. Therefore, when a user draws film over the focal plane shutter blade to wind onto a spool, the focal plane shutter blade is prevented from touching the film. (step 300) In response to the control signal received from the controller 2, the electromagnetic unit Mg1 of the leading blade curtain driver 31 is de-energized to contract the leading blade curtain 61. When a film cartridge is not loaded, the flow proceeds to step 400.

When a user closes the back cover 1, a back cover switch S1 generates a corresponding signal to the controller 2. (step 400) When the back cover 1 is not closed, the flow proceed to step 200. The controller receives the signal and generates a control signal to the shutter driver 3 to restore the focal plane shutter blade to an initial state, in order to prepare for an exposure. (step 500) Then, the camera is ready to expose the film. (step 600)

It will be apparent to those skilled in the art that various modifications and variations can be made to the apparatus and the method of the present invention without departing from the spirit and scope of the invention. The present invention covers the modifications and variations of this invention provided they come within the scope of the appended claims and their equivalents.

What is claimed is:

1. An apparatus for preventing the deviation of a focal plane shutter, comprising:

a back cover switch for detecting whether a back cover is open or closed and generating a first signal;

a film cartridge loading switch for detecting whether a film cartridge is loaded and generating a second signal;

a control unit for generating a control signal to open the focal plane shutter when the first signal indicates that the back cover is open and the second signal indicates that the film cartridge is loaded; and a shutter driver for driving the focal plane shutter in response to the control signal, wherein said control unit continues to check if the back cover is closed when the film cartridge is not loaded and generates a control signal to restore the focal plane shutter to an initial focal plane shutter state when the first signal indicates that the back cover is closed.

2. An apparatus as recited in claim 1, wherein the focal plane shutter comprises a leading blade curtain and a trailing blade curtain, and wherein the shutter driver comprises a leading blade curtain driver for driving the leading blade curtain and a trailing blade curtain driver for driving the trailing blade curtain.

3. An apparatus as recited in claim 2, wherein the control unit generates a control signal to the leading blade curtain driver to contract the leading blade curtain when the first signal indicates that the back cover is open and the second signal indicates that a film cartridge is loaded.

4. A method for preventing the deviation of a focal plane shutter in a camera having a back cover, comprising the steps of:

detecting whether a back cover is open;

detecting whether a film cartridge is loaded;

opening the focal plane shutter when the back cover is open and the film cartridge is loaded;

detecting whether the back cover is closed when the focal plane shutter is opened or the film cartridge is not loaded; and restoring the focal plane shutter to an initial focal plane shutter state when the back cover is closed.

5. A method as recited in claim 4, further comprising the steps of:

detecting whether a back cover is closed; and restoring the focal plane shutter to an initial state before the back cover is opened if said back cover is closed.

* * * * *